United States Patent
Balmakhtar et al.

(10) Patent No.: US 12,543,039 B2
(45) Date of Patent: Feb. 3, 2026

(54) AUTHENTICATION MANAGEMENT METHOD FOR NON-3GPP ACCESS OF A UE DEVICE TO A 5G NETWORK

(71) Applicant: T-Mobile Innovations LLC, Overland Park, KS (US)

(72) Inventors: Marouane Balmakhtar, Fairfax, VA (US); Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 207 days.

(21) Appl. No.: 18/336,948

(22) Filed: Jun. 16, 2023

(65) Prior Publication Data

US 2024/0422535 A1    Dec. 19, 2024

(51) Int. Cl.
*H04W 12/06* (2021.01)
*H04W 12/40* (2021.01)

(52) U.S. Cl.
CPC ........... *H04W 12/06* (2013.01); *H04W 12/40* (2021.01)

(58) Field of Classification Search
CPC ..... H04W 12/06; H04W 12/03; H04W 12/40; H04L 63/0428; H04L 63/0876
See application file for complete search history.

(56) References Cited

U.S. PATENT DOCUMENTS

| | | | |
|---|---|---|---|
| 5,764,765 A | 6/1998 | Phoenix et al. | |
| 6,748,083 B2 | 6/2004 | Hughes et al. | |
| 7,437,081 B2 | 10/2008 | Mitchell et al. | |
| 8,855,316 B2 | 10/2014 | Wiseman et al. | |
| 9,960,465 B2 | 5/2018 | Dudley et al. | |
| 10,057,058 B2 | 8/2018 | Murakami et al. | |
| 10,924,930 B2 * | 2/2021 | Salkintzis | H04W 12/106 |

(Continued)

FOREIGN PATENT DOCUMENTS

| | | |
|---|---|---|
| EP | 4478761 A1 | 12/2024 |
| WO | 2022009126 A1 | 5/2022 |
| WO | 2022175126 A1 | 8/2022 |

OTHER PUBLICATIONS

Foreign communication from related application—European Extended Search Report and Search Opinion dated Nov. 15, 2024 regarding EP Application No. 24178412.3 filed May 28, 2024, 11 pages.

(Continued)

*Primary Examiner* — Jinsong Hu

(57) ABSTRACT

A core network server for defining authentication credentials and authenticating a wireless communication device according to WIFI communication protocols includes a central processing unit (CPU) and a non-transitory memory comprising executable instructions that when executed by the CPU, causes the core network server to receive an encrypted authentication request from a wireless communication device; send the encrypted authentication request to an authentication server based on one or more attributes in the encrypted authentication request; receive an indicator of a specialized network slice associated with the wireless communication device based on sending the encrypted authentication request; communicate authentication messages to the wireless communication device according to one or more network functions of the specialized network slice; and authenticate the wireless communication device according to the specialized network slice responsive to communicating the authentication messages.

20 Claims, 8 Drawing Sheets

(56) References Cited

U.S. PATENT DOCUMENTS

| | | |
|---|---|---|
| 11,431,510 B1 | 8/2022 | Stapleton |
| 2005/0138352 A1 | 6/2005 | Gauvreau et al. |
| 2005/0221759 A1 | 10/2005 | Spadafora et al. |
| 2007/0065154 A1 | 3/2007 | Luo et al. |
| 2007/0076884 A1 | 4/2007 | Wellbrock et al. |
| 2007/0195774 A1 | 8/2007 | Sherman et al. |
| 2011/0206204 A1 | 8/2011 | Sychev |
| 2011/0213979 A1 | 9/2011 | Wiseman et al. |
| 2012/0089666 A1 | 4/2012 | Goswami et al. |
| 2014/0010234 A1 | 1/2014 | Patel et al. |
| 2014/0068765 A1 | 3/2014 | Choi et al. |
| 2014/0133652 A1 | 5/2014 | Oshida et al. |
| 2016/0155327 A1 | 6/2016 | Schlienz et al. |
| 2016/0241396 A1 | 8/2016 | Fu et al. |
| 2016/0359626 A1 | 12/2016 | Fu et al. |
| 2016/0366094 A1 | 12/2016 | Mason et al. |
| 2017/0214525 A1 | 7/2017 | Zhao et al. |
| 2017/0230173 A1 | 8/2017 | Choi |
| 2017/0338952 A1 | 11/2017 | Hong et al. |
| 2018/0041494 A1 | 2/2018 | Quintero Cantero et al. |
| 2018/0060572 A1 | 3/2018 | Singleton et al. |
| 2018/0176091 A1 | 6/2018 | Yoon et al. |
| 2019/0036821 A1 | 1/2019 | Levy et al. |
| 2019/0260581 A1 | 8/2019 | Su et al. |
| 2019/0349392 A1 | 11/2019 | Wetterwald et al. |
| 2019/0387465 A1 | 12/2019 | Gandhewar et al. |
| 2020/0084222 A1 | 3/2020 | William et al. |
| 2020/0092095 A1 | 3/2020 | Yang et al. |
| 2020/0280854 A1* | 9/2020 | Kunz ................. H04W 12/0431 |
| 2021/0195689 A1* | 6/2021 | Pocha ................. H04W 12/06 |
| 2021/0258787 A1* | 8/2021 | Bernsen ................. H04L 63/18 |
| 2022/0046416 A1* | 2/2022 | Suzuki ................. H04W 12/08 |
| 2022/0086145 A1* | 3/2022 | Lei ................. H04W 12/72 |
| 2022/0330022 A1 | 10/2022 | Kolekar et al. |
| 2022/0360434 A1 | 11/2022 | Choi et al. |
| 2023/0236902 A1 | 7/2023 | Zhao et al. |
| 2023/0388289 A1 | 11/2023 | Li et al. |
| 2023/0388788 A1* | 11/2023 | Kunz ................. H04W 12/106 |
| 2024/0292215 A1* | 8/2024 | Watfa ................. H04W 12/06 |
| 2024/0333398 A1 | 10/2024 | Bush |
| 2024/0357349 A1* | 10/2024 | Balmakhtar ......... H04L 9/0866 |
| 2024/0373220 A1* | 11/2024 | Kweon ................. H04L 9/40 |
| 2024/0381081 A1* | 11/2024 | Normann ............. H04W 12/06 |
| 2025/0119734 A1 | 4/2025 | Balmakhtar et al. |
| 2025/0133487 A1* | 4/2025 | Targali ................. H04W 4/50 |

OTHER PUBLICATIONS

Restriction Requirement dated May 21, 2025, U.S. Appl. No. 18/482,735, filed Oct. 6, 2023.

Balmakhtar, Marouane, et al., "Method for Device Security Gateway Function," filed Oct. 6, 2023, U.S. Appl. No. 18/482,735.

Bertz, Lyle, et al., "Wireline Access Network Supporting User Equipment With Non-3rd Generation Partnership Project Inter-Working Function Interface," filed Jul. 23, 2025, U.S. Appl. No. 19/278,649.

Bertz, Lyle, et al., "Virtual Private Network (VPN) Authentication for Devices," filed Sep. 16, 2025, U.S. Appl. No. 19/330,602.

First Office Action dated Nov. 5, 2025, U.S. Appl. No. 18/482,735, filed Oct. 6, 2023.

* cited by examiner

AUTHENTICATION MANAGEMENT METHOD FOR NON-3GPP ACCESS OF A UE DEVICE TO A 5G NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication devices such as, for example, consumer devices and Machine-to-Machine (M2M) communication devices are widely deployed in a wireless network, such as a cellular network. Consumer devices may include a smart phone, a tablet computer, a wearable computer, or a desktop computer, while M2M devices may include Internet of Things (IoT) devices such as smart TVs, smart speakers, connected thermostats, home security systems, domestic robots, smart bulbs, energy monitors, connected appliances, smart door locks, connected car devices, or other similar everyday IoT devices. Cellular networks may exchange wireless signals with communication devices using wireless network protocols. Exemplary wireless network protocols include Institute of Electrical and Electronic Engineers (IEEE) 802.11 (WIFI), Long Term Evolution (LTE), Fifth Generation (5G) New Radio (5GNR), and Low-Power Wide Area Network (LP-WAN).

A communication device may be provisioned with a physical subscriber identification module (SIM) card, an Embedded Subscriber Identity Module (eSIM), an integrated SIM (iSIM), or a virtual SIM (generally referred to as a "SIM"), and may use Third Generation Partnership Project (3GPP) access to a cellular network using the 5GNR network protocol so as to receive text data, voice data, video data, support services, and other similar services from a 5G Core Network of a 5G communication network. However, a communication device may also use a non-3GPP access network such as, for example, an IEEE 802.11 network connection (e.g., WIFI) in order to access services of the 5G Core Network.

SUMMARY

In an embodiment, a core network server for defining authentication credentials and authenticating a wireless communication device according to WIFI communication protocols is disclosed. The wireless communication device includes a central processing unit (CPU) and a non-transitory memory comprising executable instructions that when executed by the CPU, causes the core network server to receive an encrypted authentication request from a wireless communication device; send the encrypted authentication request to an authentication server based on one or more attributes in the encrypted authentication request; receive an indicator of a specialized network slice associated with the wireless communication device based on sending the encrypted authentication request; communicate authentication messages to the wireless communication device according to one or more network functions of the specialized network slice; and authenticate the wireless communication device according to the specialized network slice responsive to communicating the authentication messages.

In another embodiment, a system for defining authentication credentials and authenticating a wireless communication device according to WIFI communication protocols comprising a wireless communication device, a data registry, a core network server, and an authentication server is disclosed. The wireless communication device is configured to obtain a decentralized identity (DID) from one or more of wireless communication-device attributes and user attributes; send the DID; and send an encrypted authentication request to a core network server. The data registry is configured to receive the DID from the wireless communication device; and store the DID. The core network server is configured to receive the encrypted authentication request; and send the encrypted authentication request to an authentication server based on one or more attributes in the encrypted authentication request. The authentication server is configured to determine a specialized network slice associated with the wireless communication device based on the encrypted authentication request; communicate authentication messages to the wireless communication device according to one or more network functions of the specialized network slice; and authenticate the wireless communication device according to the specialized network slice responsive to communicating the authentication messages.

In yet another embodiment, a method for defining authentication credentials and authenticating a wireless communication device according to WIFI communication protocols is disclosed. The method comprises obtaining, at a wireless communication device, a decentralized identity (DID) from one or more of wireless communication-device attributes and user attributes; sending, by the wireless communication device, the DID to a data registry; sending, by the wireless communication device, an encrypted authentication request to a core network server; receiving, by the data registry, the DID from the wireless communication device; storing, by the data registry, the DID; receiving, by the core network, the encrypted authentication request from the wireless communication device; sending, by the core network server, the encrypted authentication request to an authentication server based on one or more attributes in the encrypted authentication request; determining, by the authentication server, a specialized network slice associated with the wireless communication device responsive to receiving the encrypted authentication request; communicating, by the authentication server, authentication messages to the wireless communication device according to one or more network functions of the specialized network slice; and authenticating, by the authentication server, the wireless communication device according to the specialized network slice responsive to communicating the authentication messages.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
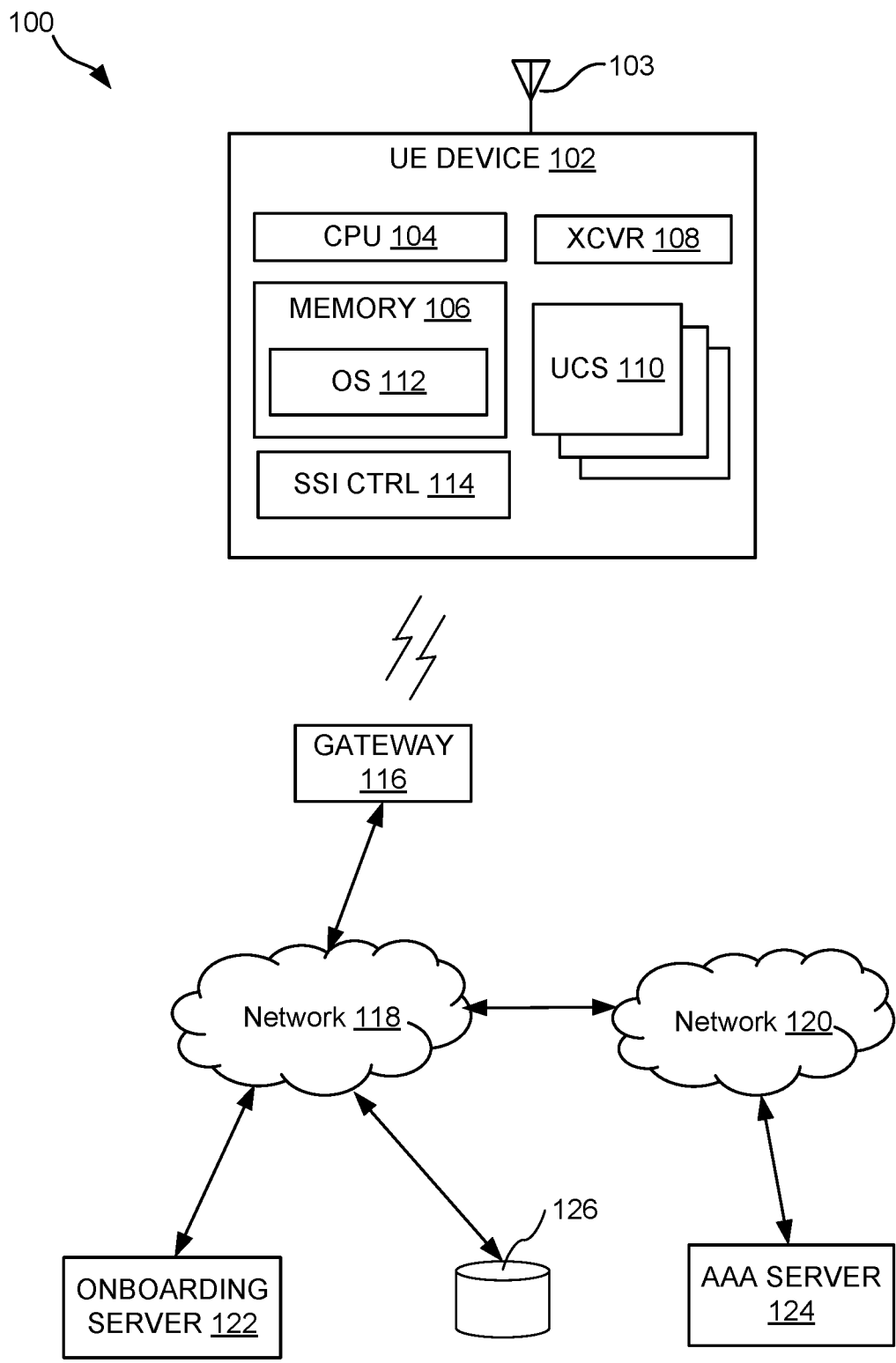
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Communication devices such as, for example, consumer devices and Machine-to-Machine (M2M) communication devices are widely deployed in a wireless network, such as a cellular network. In an example, a 5G communication device may be provisioned with a SIM card and may receive 3GPP access to 5G services of a 5G cellular network of an MNO using a 5GNR network protocol. The 5G communication device may be authenticated using authentication information from the SIM card to receive text data, voice data, video data, support services, and other similar services of the 5G Core Network. Further, the 5G communication device may use non-3GPP access to connect to the 5G Core Network of a 5G communication network using a wireless local area network (WLAN) connection or a wired connection such as, for example, use trusted non-3GPP access to a secure IEEE 802.1x WIFI network of a cellular network of a mobile/cellular network operator (MNO) for receiving 5G data services of the 5G Core Network. Authenticating a 5G communication device to the 5G Core Network for trusted 3GPP access or non-trusted 3GPP access may use one or more Authentication and Key Agreement (AKA) protocols such as, for example, a 5G-AKA or Extensible Authentication Protocol-AKA prime (EAP-AKA'). Authenticating a communication device for non-3GPP access may use EAP-5G or EAP-Transport Layer Security (EAP-TLS). The different authentication protocols may use certificates, encryption keys, tokens, or other similar mechanisms that may require selecting network slices having different virtualized network functions (VNF) of the 5G Core Network in order to segregate 3GPP authentication from non-3GPP authentication.

The deployment of IoT devices has continued to increase in consumer applications such as smart TVs, smart speakers, connected thermostats, home security systems, domestic robots, smart bulbs, energy monitors, connected appliances, smart door locks, connected car devices, or other similar everyday IoT devices. These IoT devices may not be provisioned with a SIM card (also referred to as a non-SIM IoT device), and may use non-3GPP access to access the 5G Core Network. For instance, the non-SIM IoT device may use non-3GPP access via an untrusted WLAN, for example, access via a private WIFI that is not associated or provided by an MNO, and may use digital certificates or cryptographic keys for authentication using 5G-AKA, EAP-AKA', EAP-5G, or EAP-TLS. For a 5G device accessing the 5G Core Network using credentials from a SIM card, authentication keys are maintained in a secure zone within the device (for example, in the SIM card) in order to protect the 5G device from untrustworthy users or hackers attempting to gain unauthorized access to the 5G Core Network. However, an IoT device without a SIM (e.g., the non-SIM IoT device) using a digital certificate or encryption keys may not securely segregate the digital certificate or keys from other applications within the non-SIM IoT device, and may pose a risk that the digital certificate may be accessed without authorization by the user of the non-SIM IoT device to gain access to the 5G Core Network. Further, the 5G Core Network may have to manage encryption keys and certificates of each non-SIM IoT device that is authorized to the 5G Core Network. More non-SIM IoT devices are being introduced into consumer applications that may use different authentication protocols (for example, non-3GPP or non-5G authentication protocols) that may have different network slice authentication requirements, and certificate and encryption key management for each non-SIM IoT device that is authenticated to the 5G Core Network may become unmanageable to the 5G Core Network.

As disclosed herein, an authentication management method for a communication device/user equipment (UE) device without a SIM for non-3GPP access to 5G services such as those of a 5G Core Network is provided. In an example, the UE device may be a non-SIM UE device. As used herein, a non-SIM UE device may not have a subscription capability of a SIM such as, for example, may not have digital credentials accessed from a SIM (for example, from an eSIM or an iSIM) but may include a client stack, a controller (e.g., a communication application), and/or a digital wallet to generate, store and communicate digital credentials using secure encrypted systems similar in lieu of those used in UE devices with traditional SIMs.

In an embodiment, the UE device without a SIM capability (hereinafter referred to as a UE device in the disclosure) may be pre-authenticated to the 5G Core Network based on an onboarding process when the UE device is provisioned to the user. In an example, pre-authenticating the UE device includes determining a specialized network slice within the 5G Core Network for the UE device. In an example, during the onboarding process, the UE device may subscribe to a software stack that is based on pre-defined or pre-authorized subscription information for the UE device. In an example, the UE device may create a decentralized identity (ID) that is stored at a data registry during the onboarding process, and which may be used to pre-authenticate the UE device. In an example, the 5G Core Network may use the decentralized ID to determine the Authentication, Authorization, and Accounting server (AAA-S) associated with the UE device. In an example, the AAA-S may determine one or more of whether the UE device is registered at the data registry, the type of UE device and the specialized network slice authorized for the UE device. In an example, the data registry may be associated with the enterprise or with an MNO. In an embodiment, the AAA-S sends an authentication response to the UE device that indicates whether the UE device is authorized for authentication by the 5G Core Network and indicates the network slice specific authentication and authorization for the UE device. In an example, the specialized network slice defines one or more VNFs of the AMF for providing registration, security, connection, and authentication and authorization to the 5G Core Network. In an embodiment, the 5G Core Network performs non-3GPP network slice-specific authentication and authorization for the UE device after pre-authentication using any one of 5G-AKA, EAP-AKA', EAP-5G, EAP-TLS, or the like. In an example, the AMF may invoke a Network Slice-Specific Authentication and Authorization Function (NSSAAF) at the 5G Core Network to select the appropriate N3IWF and AMF when performing network slice-specific authentication and authorization for the UE device according to 5G-AKA, EAP-AKA', EAP-5G, EAP-TLS. The disclosure described herein provides advantages over conventional solutions whereby pre-authenticating the UE device (for example, a non-SIM UE device) to a specialized network slice provides slice-specific authentication requirements which includes authenticating the UE to one or more VNFs of the AMF for providing registration, security, connection, and authentication and authorization of the UE to the 5G Core Network. This pre-authentication avoids the requirement to manage various encryption keys and certificates for non-SIM UE devices that may use different authentication protocols (for example, non-3GPP or non-5G authentication protocols). Further, the disclosure provided here helps to manage network traffic efficiency and overload in security and authorization for the various non-SIM devices that are being provisioned to the 5G Core Network.

Turning now to FIG. 1, a communication system 100 is described according to an embodiment. In an embodiment, the communication system 100 is configured for authenticating a UE that is a non-SIM device (e.g., the non-SIM UE device discussed above) for non-3GPP access to a 5G Core Network. The user of the UE device may be a subscriber of a 5G communication network or a user of an enterprise device that is subscribed to the 5G communication network. While the communication system 100 is described for authenticating the UE device for non-3GPP access to a 5G Core Network, the communication system may also be contemplated for 3GPP and non-3GPP access to a 4G/5G communication network for receiving text data, voice data, video data, support services, and other similar services. Further, the communication system 100 is also contemplated for authenticating the UE device for all non-3GPP access including trusted non-3GPP access and non-trusted non-3GPP access such as, for example, via a Trusted non-3GPP access network (TNAN) using, for example, Trusted Non-3GPP Gateway Function (TNGF), a trusted WLAN access network using, for example, Trusted Non-3GPP Access Point (TNAP) and Trusted WLAN Inter-Working Function (TWIF), and wireline non-3GPP access such as broadband and cable networks using, for example, Wireline-Access Gateway Function (W-AGF).

In an embodiment, the communication system 100 may comprise a UE 102, a gateway 116, a first communication network 118, a second communication network 120, an onboarding server 122, an Authentication, Authorization, and Accounting server (AAA-S) 124, and data storage 126. The UE 102 may be a communication device such as, for example, a smart TV, a smart speaker, connected thermostats, home security systems, domestic robots, smart bulbs, energy monitors, a connected appliance, a smart door lock, a connected car device, or other similar everyday IoT devices that has one or more processors, memory, and transceiver components. The UE 102 may be a fixed non-SIM device or a mobile non-SIM device. In an embodiment, the UE 102 comprises an antenna 103, a central processing unit (CPU) 104, a memory 106 that stores an operating system (OS) 112, a radio frequency (RF) transceiver 108, a self-sovereign identity (SSI) controller 114, a universal connectivity stack (UCS) 110.

In an embodiment, the antenna 103 may be communicatively coupled to the radio frequency (RF) transceiver 108 and the SSI controller 114 through a wired connection. The antenna 103 may include radio frequency (RF) reception and transmission components of the UE 102, and may be part of the RF transceiver 108. In an embodiment, the radio frequency (RF) transceiver 108 may establish a radio communication link to the first communication network 118 via a wireless gateway 116 using the antenna 103. In an example, the first communication network 118 comprises the Internet. In an example, the communication link may be established according to a wireless network protocol that includes the IEEE 802.11 (WIFI) protocol. In an embodiment, the radio frequency RF transceiver 108 includes RF circuits that provide an air interface for the UE 102. While not shown in FIG. 1, the radio frequency RF transceiver 108 may include additional circuit components to process and manipulate the wireless signals at the UE 102.

The memory 106 comprises a non-transitory portion that stores one or more applications for execution by the CPU 104. In embodiments, the memory 106 embeds an operating system (OS) 112 and UCS 110. In an embodiment, the OS 112 comprises executable instructions of an OS kernel of the UE 102 that may be executed by the CPU 104 to perform operations such as, for example, operations to manage input/output data requests to the UE 102 (e.g., from software and/or applications of the UCS 110 and SSI controller 114), translate the requests into instructions (e.g., data processing instructions) for execution by the CPU 104 or other components of the UE 102, manage the UE 102 resources, such as the CPU 104 and the memory 106 when executing and providing services to applications on the UE 102 such as the UCS 110 and SSI controller 114.

In an embodiment, the SSI controller 114 may comprise a communication application that is configured to send and receive communications to the communication networks 118 and 120. In examples, UCS 110 may include a software library to perform specific user-related telecommunications tasks such as, for example, for establishing a secure connection between the UE 102 and communication networks 118 and 120. In examples, the UCS 110 may include one or more of a virtual private network (VPN) client such as an Internet Protocol Security (IPsec) protocol suite for establishing the secure connection/tunnel over WLAN between the UE and the 5G communication network, a non-access stratum (NAS) protocol suite for communicating signaling messages, and cryptographic public keys. In an example, the UE 102 may register to receive the UCS 110 from an onboarding server 122. In another example, the UE 102 may download the UCS 110 from the onboarding server.

In an embodiment, the SSI controller 114 is configured as a utility application that is in communication with the second communication network 120 via gateway 116. In examples, the SSI controller 114 may create a digital identifier or digital credentials from one or more of user-created attributes and the manufacturer-created attributes, and may send, via the first communication network 118, the digital credentials to a data registry 126. In examples, the data registry 126 may be a blockchain or another similar decentralized data registry that is controlled by the second communication network 120 of an MNO. The SSI controller 114 comprises executable instructions that when executed by the CPU 104 may execute instructions or code of the SSI controller 114 to form an IP connection between the SSI controller 114 and the second communication network 120.

The UE 102 may be communicatively coupled to the second communication network 120 via the first communication network 118. The second communication network 120 may be a Core Network (for example, a macro network) of a network provider. In an embodiment, the UE 102 may request 5G services via the first communication network 118 using the radio communication link. In examples, the communication between the first communication network 118 and the second communication network 120 may be established according to an LTE protocol, a CDMA protocol, a GSM protocol, or a 5G telecommunication protocol. The second communication network 120 may provide 5G services to the UE 102 using network functions, that include voice, data, and messaging services. The second communication network 120 may be communicatively coupled to AAA server 124 for authenticating the UE 102 for non-3GPP access to the second communication network 120. For instance, the AAA server 124 may determine whether the UE 102 is registered at the data registry 126, the type of UE 102, and the specialized network slice authorized for the UE 102. In an embodiment, the AAA server 124 may authenticate the UE 102 for 5G services of the 5G Core Network using a network slice specific authentication and authorization method. In an example, the specialized network slice defines one or more VNFs of the AMF for providing registration, security, connection, and authentication and authorization of the UE 102 to the 5G Core Network. The system 100 may comprise additional communication networks similar to the first communication network 118 and second communication network 120.

Figure 2:
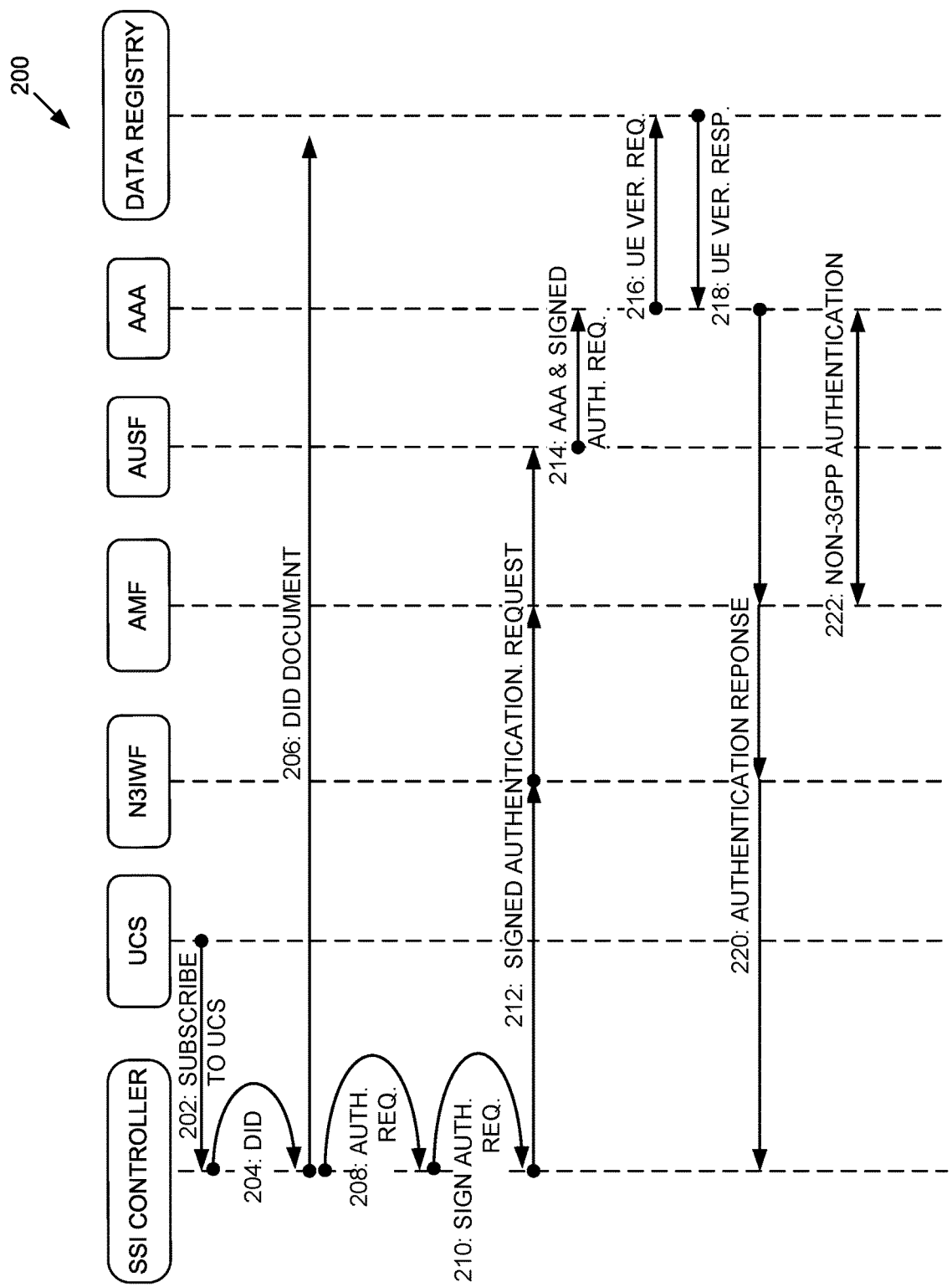
FIG. 2 is a data flow diagram according to an embodiment of the disclosure.

Turning now to FIG. 2, and with continued reference to FIG. 1, a data flow diagram 200 is described. In an embodiment, the data flow diagram 200 illustrates an authentication management method of a UE device without a SIM (e.g., a non-SIM UE device) for non-3GPP access to a 5G Core Network. In an example, the authentication management method may authenticate the UE device to a specialized network slice within the 5G Core Network that is based on pre-defined subscription information for the UE device. In examples, the UE device may be the UE 102 in FIG. 1.

At step 202, an SSI controller on the UE device initially subscribes to a universal connectivity stack (UCS). In an example, the SSI controller may be the SSI controller 114 and the UCS may be UCS 110 in FIG. 1. In an example, the SSI controller may subscribe to the UCS as part of an onboarding process for pre-authentication/pre-clearance the UE device for 5G Core Network authentication to a specialized network slice within the 5G Core Network. In an example, pre-authenticating UE device includes determining a specialized network slice within the 5G Core Network for the UE device in order to implement registration, security, connection, and authentication and authorization of the UE device to the 5G Core Network. In examples, the UCS may be stored at an onboarding server and associated with an MNO or an enterprise. In an example, the UCS may be downloaded to the UE device from the onboarding server by a manufacturer of the UE device prior to provisioning the UE device to the user. In another example, the UCS may be downloaded by the user from the onboarding server via a WLAN after the UE device is received by the user.

In an example, the UCS is a software stack that may include executable components comprising one or more of an operating system, architectural layers, protocols, runtime environments, databases and function calls. In examples, the software stack may include executable components to instantiate one or more of a virtual private network (VPN) client according to an Internet Protocol Security (IPsec) protocol, a communication signaling session according to a non-access stratum (NAS) protocol, and encryption and decryption algorithms according to public key infrastructure (PKI). In an example, an MNO of a cellular network may control the software stack of the UCS, which may be assigned a UCS identifier. The UCS identifier is a unique identifier that assigns the contents of the software library to the UE device, in order to ensure that the software library is authenticated to the UE device (for example, when downloaded by the manufacturer or by the user to the UE device). Hence, the UCS identifier prevents the UCS from being installed on more than one UE device thereby preventing a malicious actor from spoofing the UCS and gaining unauthorized access to the 5G Core Network.

At step 204, the user creates a decentralized identity (DID). In an embodiment, the DID may be considered to be a self-sovereign identity, for example a digital identity that is owned, in a certain sense, by the user. For example, the DID includes digital credentials that are controlled by the user. In an example, the user may use the SSI controller to create the DID from a combination of user attributes (e.g., attributes that are created by the user of the UE device) and communication-device attributes (e.g., attributes created or defined by the manufacturer of the UE device). In an example, the user attributes may include a username, a password, a graphic symbol, a QR code, or similar user attributes. In an example, the communication-device attributes are created by the manufacturer of the UE device and are embedded in the UE device prior to the UE device being provisioned to the user. In some examples, the communication-device attributes may include one or more of a UE device ID, a domain name associated with an enterprise provisioning the UE device to the user, a central processing unit (CPU) ID, a media access control (MAC) address ID, a cryptographic key ID based on a PKI protocol, UE device ID, and hardware IDs of other components on the UE device. In an example, the UE device ID may be a domain name of a Uniform Resource Locator (URL) address of an enterprise that the UE device is associated with or subscribes to. In an example, the domain name may determine the specialized network slice functions of the 5G Core Network that is associated with the UE device according to the entity (e.g., MNO or the enterprise) that the UE device is associated with or subscribes to. In an example, the SSI controller may create the DID from one or more of user attributes and the communication-device attributes.

At step 206, the SSI controller records the DID in a data registry. In an example, the user may send, via the SSI controller, the DID document having the DID to the data registry for recording the DID. In examples, the data registry may be a blockchain or another similar decentralized data registry that is accessible by the MNO or by the enterprise. In an example, the data registry may be associated with the enterprise or with the MNO. In an example, the DID document may be transmitted to the data registry as part of the onboarding process (for example, prior to the UE device sending a signed authentication request for pre-authentication of the UE device at the 5G Core Network).

At step 208, the SSI controller 202 creates a UE device authentication request. In an example, the UE device authentication request may include one or more elements including one or more of the DID, a UE device identifier, and a domain name associated with the UE device. In an example, the UE device authentication request may be configured for requesting non-3GPP access to 5G services of the 5G Core Network.

At step 210, the SSI controller 202 encrypts the UE device authentication request with a cryptographic key. In an example, the SSI controller 202 may use a private key to encrypt one or more elements of the authentication request and create a signed authentication request. In examples, the DID may be encrypted in the UE device authentication request or the DID may be encrypted with additional elements to create the signed authentication request.

At step 212, the SSI controller sends the signed authentication request to a non-3GPP Inter-Working Function (N3IWF). In an example, the SSI controller sends the signed authentication request to the N3IWF via a VPN client such as, for example, an IPsec client. In an example, the N3IWF routes the signed UE device authentication request to the AMF for performing pre-clearance of the UE device. In an example, the N3IWF acts as a gateway for the UE device and routes the signed authentication request to the AMF for authentication after receiving it from the SSI controller. In an example, the AMF further routes the signed authentication request to the AUSF/AAA.

At step 214, the Authentication Server Function (AUSF) determines the Authentication, Authorization, and Accounting server (AAA-S) that is associated to process the signed authentication request based on one or more attributes of the signed authentication request. In examples, the AUSF uses the domain name in the signed authentication request or the UE device ID to determine the AAA-S associated with the UE device. In an example, the AUSF may determine the UE device is associated with company_A (e.g., an enterprise) based on the domain name being company_A.com) or the UE device ID indicates the enterprise associated with the UE device. In another example, the AUSF may determine the UE device is associated with the MNO when the domain name includes the MNO name or the UE device ID indicates the MNO being associated with the UE device. In an example, the AAA sends the signed authentication request to the AAA-S associated with the UE device. In an example, the AAA-S may be a separate VNF at an enterprise server or may be embedded into the AUSF at the 5G Core Network. In an example, the AUSF sends a signed authentication request via a AAA-proxy (AAA-P) to a remote AAA-S outside the 5G Core Network and that is associated with an enterprise when the signed authentication request includes a domain name or a UE device ID associated with the enterprise. In another example, the AUSF may send the signed authentication request directly to a AAA-S of an MNO inside the 5G Core Network when the signed authentication request includes a domain name or a UE device ID associated with an MNO.

At step 216, the AAA-S sends a client verification request to the data registry. In an example, the client verification request includes a UE device ID for determining registration information of the UE device ID at the data registry, a class of device for the UE device, and/or a specialized network slice that UE device is associated with. In an example, the AAA-S uses a decryption key to decrypt the DID with a public key to obtain a decrypted UE device ID. In an example, the AAA-S sends the DID to obtain a look up of the DID at the data registry for determining validity of the attributes or credentials of the UE device at the data registry. In an example, the AAA-S obtains the UE device ID from the signed authentication request and sends the client verification request with the UE device ID to the data registry. In an example, the client verification request may request verification of the UE device ID in the data registry and/or request identification of the network slice assigned to the UE device based on the UE device ID.

At step 218, the AAA-S receives a client verification response from the data registry. In examples, the client verification response includes information on registration of the UE device ID in the data registry including whether the UE device is registered to an enterprise and a specialized network slice assigned to or associated with the UE device. In an example, the AAA-S allows the non-3GPP authentication of the UE device to proceed when the result of the look up indicates valid credentials for the UE device.

At step 220, the AAA-S sends an authentication response to the SSI controller at the UE device. In an example, the authentication response indicates whether the UE device is authorized for authentication by the 5G Core Network and indicates the network slice specific authentication and authorization for the UE device. In an embodiment, the authentication response may include a Network Slice-Specific Authentication and Authorization Function (NSSAAF) ID to indicate the specialized network slice of the UE device for further authentication of the UE device. In an example, the specialized network slice defines one or more VNFs of the AMF for providing registration, security, connection, and authentication and authorization to the 5G Core Network.

At step 222, the 5G Core Network performs non-3GPP network slice-specific authentication and authorization for the UE device using any one of 5G-AKA, EAP-AKA', EAP-5G, EAP-TLS, or the like. In an example, the AMF invokes a NSSAAF at the AAA-S to select the appropriate N3IWF and AMF when performing modified network slice-specific authentication and authorization of the UE device. In an example, the NSSAAF may relay the EAP messages that are received by the AMF from the UE device during authentication to the AAA-S, and collect the results of slice-specific authentication and authorization from the AAA-S. In an example, once authenticated to the 5G Core Network, the UE device may receive controlled non-3GPP access to the 5G Core Network for communicating text data, voice data, video data, support services, and other similar services between the UE device and the 5G Core Network as determined by the specialized network slice.

Figure 3:
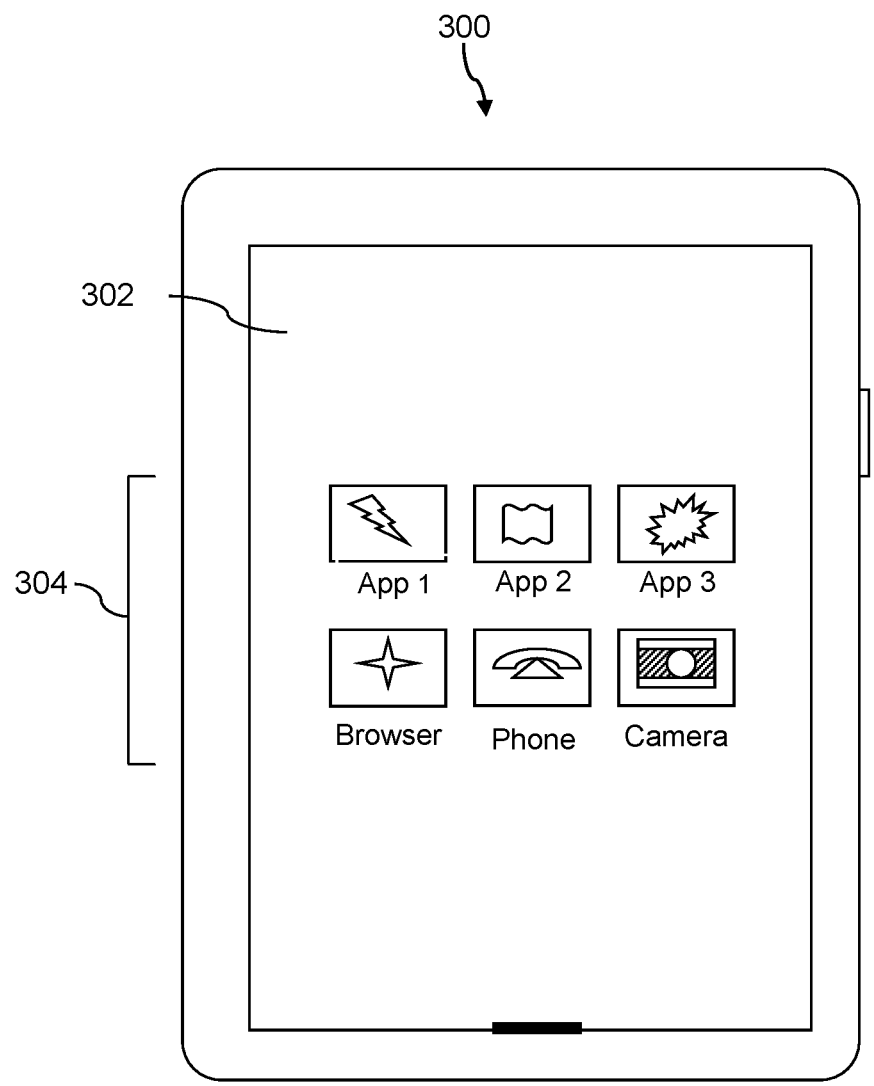
FIG. 3 is an illustration of a communication device according to an embodiment of the disclosure.

FIG. 3 depicts UE 300, which is operable for implementing aspects of the present disclosure, but the present disclosure should not be limited to these implementations. Though illustrated as a communication device, the UE 300 may take various forms including a smart vehicle, a smart appliance (for example, a smart refrigerator), a smart phone, a wearable computer, a personal digital assistant (PDA), a headset computer, a laptop computer, a notebook computer, and a tablet computer. In an example, the UE 300 may be the UE device 102 in FIG. 1

The UE 300 includes a touchscreen display 302 having a touch-sensitive surface for input by a user. A small number of application icons 304 are illustrated within the touch screen display 302. It is understood that in different embodiments, any number of application icons 304 may be presented in the touch screen display 302. In some embodiments of the UE 300, a user may be able to download and install additional applications on the UE 300, and an icon associated with such downloaded and installed applications may be added to the touch screen display 302 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 302 to show a web page. The web page may be obtained via wireless communications with a base transceiver station, a wireless network access node, a peer UE 300 or any other wireless communication network or system.

Figure 4:
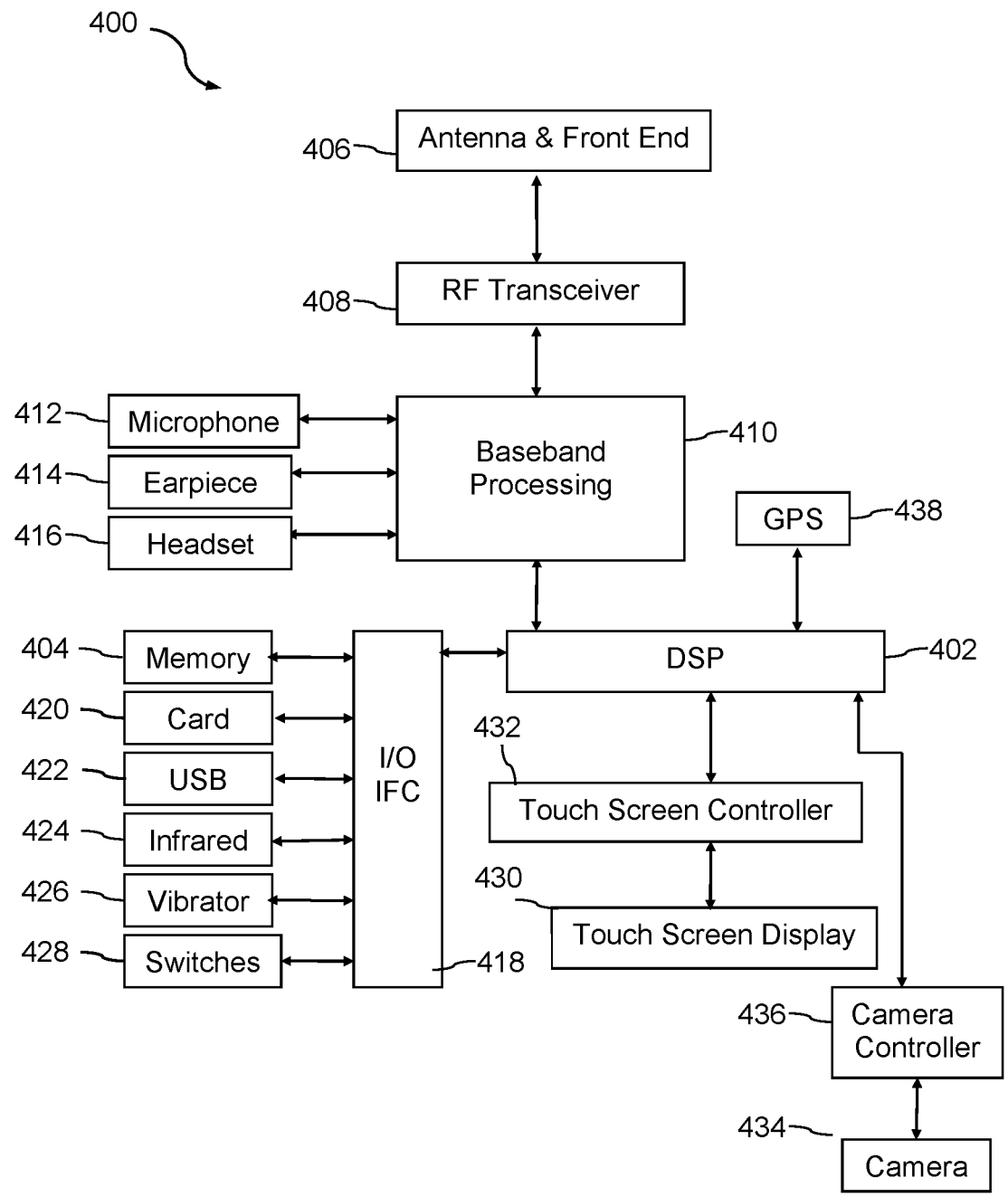
FIG. 4 is a block diagram of a hardware architecture of a communication device according to an embodiment of the disclosure.

FIG. 4 shows a block diagram of the UE 400. While a variety of known components of a communication device are depicted, in an embodiment a subset of the listed components and/or additional components not listed may be included in the UE 400. The UE 400 includes a digital signal processor (DSP) 402 and a memory 404. As shown, the UE 400 may further include one or more antenna and front end unit 406, a one or more radio frequency (RF) transceiver 408, a baseband processing unit 410, a microphone 412, an earpiece speaker 414, a headset port 416, an input/output (I/O) interface 418, a removable memory card 420, a Universal Serial Bus (USB) port 422, an infrared port 424, a vibrator 426, one or more electro-mechanical switches 428, a touch screen display 430, a touch screen controller 432, a camera 434, a camera controller 436, and a global positioning system (GPS) receiver 438. In an embodiment, the UE 400 may include another kind of display that does not provide a touch sensitive screen. In an embodiment, the UE 400 may include both the touch screen display 430 and additional display component that does not provide a touch sensitive screen. In an embodiment, the DSP 402 may communicate directly with the memory 404 without passing through the input/output interface 418. Additionally, in an embodiment, the UE 400 may comprise other peripheral devices that provide other functionality.

The DSP 402 or some other form of controller or central processing unit operates to control the various components of the UE 400 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the UE 400 to function as a peripheral device to exchange information with a personal computer or other computer system. The infrared port 424 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, an LTE protocol, a CDMA protocol, a GSM protocol. In an embodiment, one of the radio transceivers 408 may comprise a near field communication (NFC) transceiver. The NFC transceiver may be used to complete payment transactions with point-of-sale terminals or other communications exchanges. In an embodiment, each of the different radio transceivers 408 may be coupled to its own separate antenna. In an embodiment, the UE 400 may comprise a radio frequency identify (RFID) reader and/or writer device.

The switches 428 may couple to the DSP 402 via the input/output interface 418 to provide one mechanism for the user to provide input to the UE 400. Alternatively, one or more of the switches 428 may be coupled to a motherboard of the UE 400 and/or to components of the UE 400 via a different path (e.g., not via the input/output interface 418), for example coupled to a power control circuit (power button) of the UE 400. The touch-screen display 430 is another input mechanism, which further displays text and/or graphics to the user. The touch screen LCD controller 432 couples the DSP 402 to the touch screen display 430. The GPS receiver 438 is coupled to the DSP 402 to decode global positioning system signals, thereby enabling the UE 400 to determine its position. In an embodiment, the UE 400 is the UE 102 of FIG. 1 that may include a smart high-science appliance such as a smart vehicle, a smart appliance (for example, a smart refrigerator), a smart phone, a wearable computer, a personal digital assistant (PDA), a headset computer, a laptop computer, a notebook computer, and a tablet computer.

Figure 5:
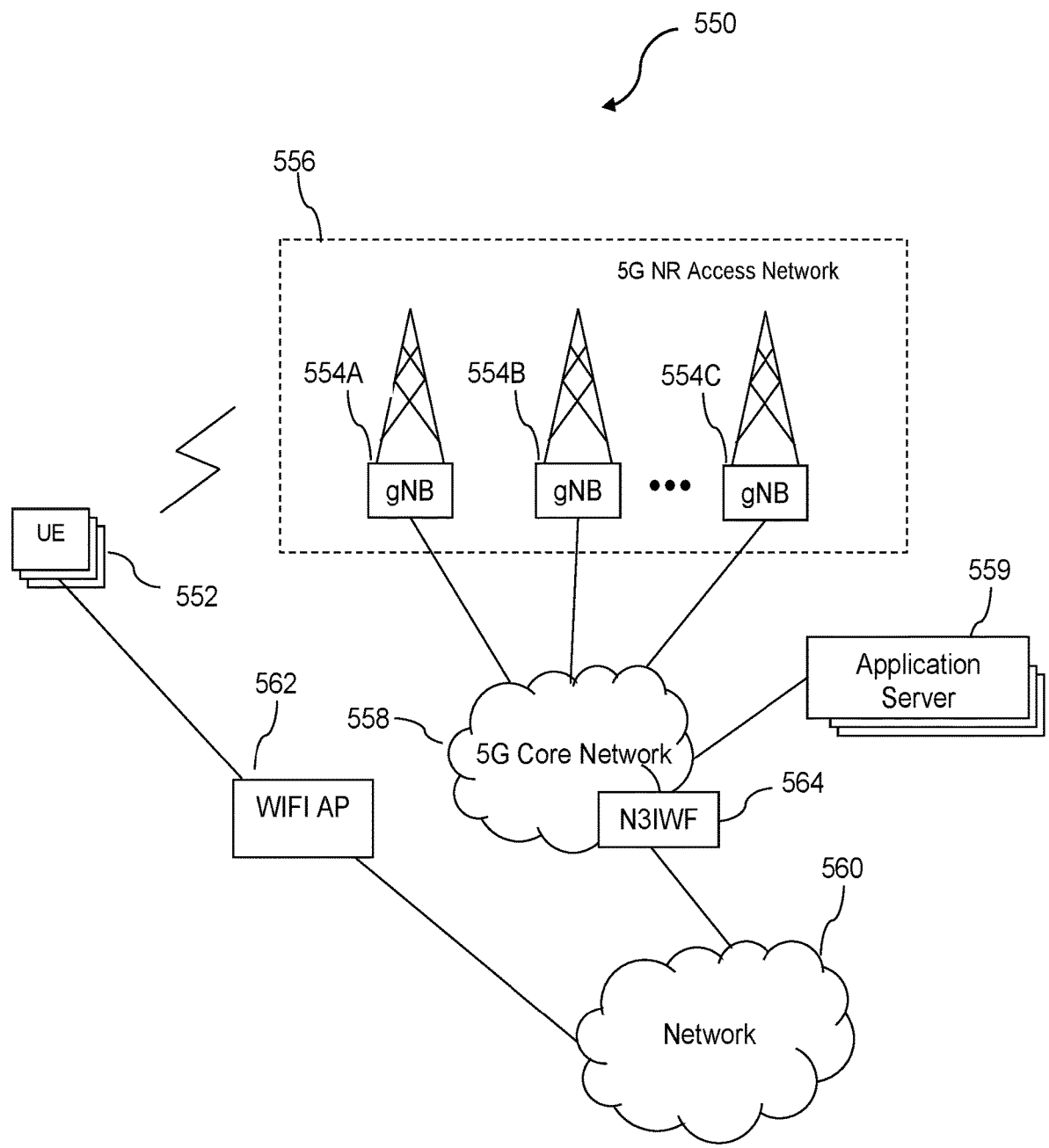
FIG. 5 is a block diagram of a communication system according to an embodiment of the disclosure.

Turning now to FIG. 5, an exemplary communication system 550 is described. Parts of the 5G communication network 118 described above with reference to FIG. 1 may be implemented substantially like the communication system 550 described in FIG. 5 and FIG. 6. Typically, the communication system 550 includes a number of access nodes 554A-554C that are configured to provide coverage in which UEs 552 such as cell phones, tablet computers, machine-type-communication devices, tracking devices, embedded wireless modules, and/or other wirelessly equipped communication devices (whether or not user operated), can operate. The UE 552 may be the UE 102 that operates with the 5G communication network 120 (FIG. 1). The access nodes 554A-554C may be said to establish an access network 556. The access network 556 may be referred to as a radio access network (RAN) in some contexts. In a 5G technology generation, an access node 554A-554C may be referred to as a gigabit Node B (gNB). In 4G technology (e.g., long term evolution (LTE) technology) an access node 554A-554C may be referred to as an enhanced Node B (eNB). In 3G technology (e.g., code division multiple access (CDMA) and global system for mobile communication (GSM)) an access node 554A-554C may be referred to as a base transceiver station (BTS) combined with a basic station controller (BSC). In some contexts, the access node 554A-554C may be referred to as a cell site or a cell tower. In some implementations, a picocell may provide some of the functionality of an access node 554A-554C, albeit with a constrained coverage area. Each of these different embodiments of an access node 554A-554C may be considered to provide roughly similar functions in the different technology generations.

In an embodiment, the access network 556 comprises a first access node 554A, a second access node 554B, and a third access node 554C. It is understood that the access network 556 may include any number of access nodes 554A-554C. Further, each access node 554A-554C could be coupled with a 5G Core Network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554A-554C and could thereby communicate via the access node 554A-554C with various application servers and other entities. In another embodiment, the UE 552 may be authenticated for non-3GPP access to the 5G Core Network 558 for receiving service of the 5G Core Network. In an example, the UE 552 may establish a radio communication link to the network 560 via a non-3GPP access point (AP) such as, for example, a WIFI AP 562. In an example, the communication link may be established according to a wireless network protocol that includes the IEEE 802.11 (WIFI) protocol. Further, the UE 552 may register and authenticate with the 5G Core Network 558 using the N3IWF 564 via a VPN client such as, for example, an IPsec client. Once connected via non-3GPP access, the 5G Core Network 558 may provide 5G services to the UE 552 using network functions, that include voice, data, and messaging services.

The communication system 550 could operate in accordance with a particular RAT, with communications from an access node 554A-554C to UEs 552 defining a downlink or forward link and communications from the UEs 552 to the access node 554A-554C defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as LTE, which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554A-554C could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in an RF spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554A-554C and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554A-554C to served UEs 552. And on the uplink, certain resource elements could be reserved to carry random access signaling from UEs 552 to the access node 554A-554C, and other resource elements could be reserved to carry other control signaling such as PRB-scheduling requests and acknowledgement signaling from UEs 552 to the access node 554A-554C.

The access node 554A-554C, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center. The Cu may be hosted in user equipment.

Figure 6:
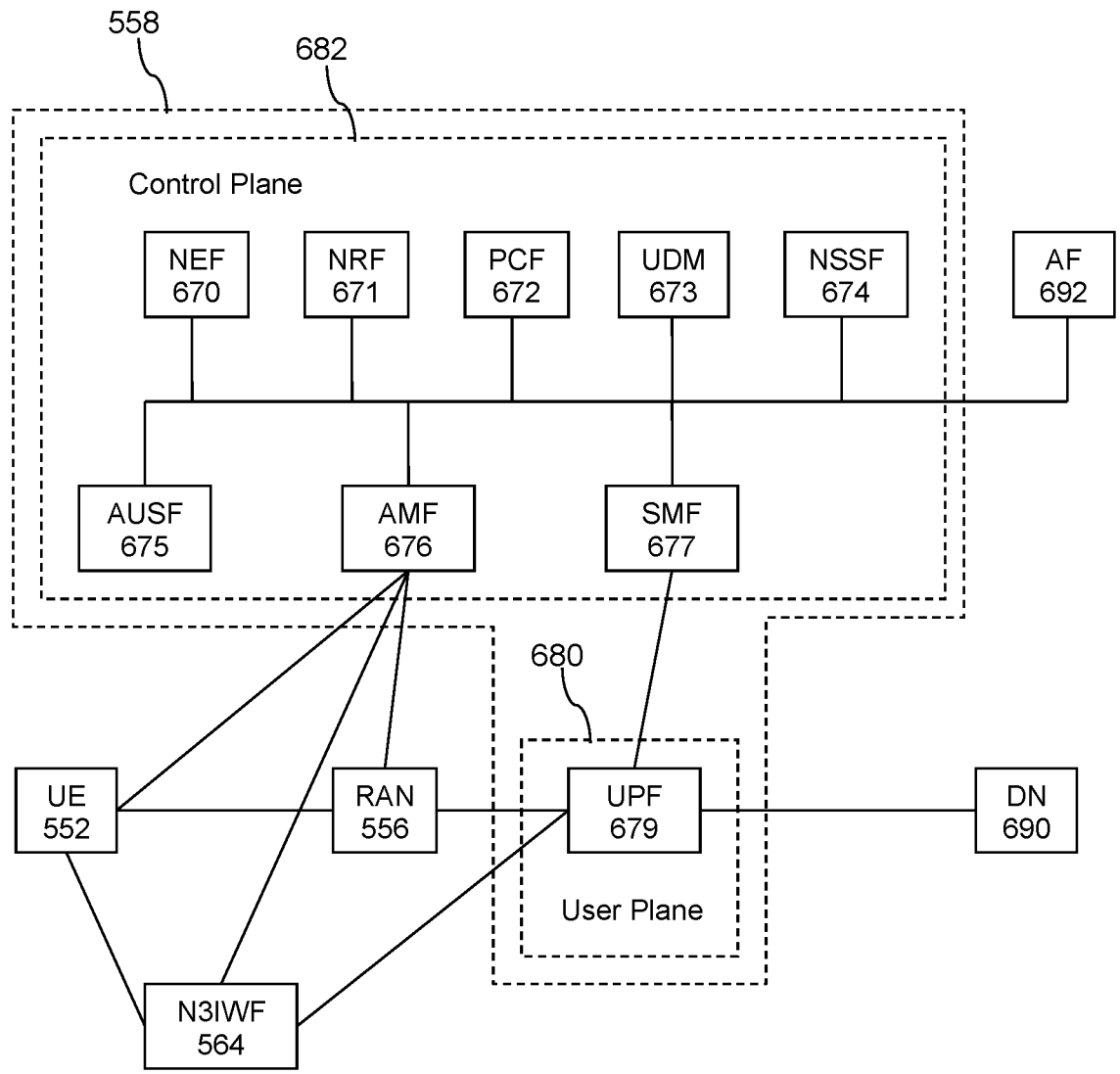
FIG. 6 is a block diagram of a core network of a communication system according to an embodiment of the disclosure.

Turning now to FIG. 6, further details of the Core Network 558 are described. In an embodiment, the Core Network 558 is a 5G Core Network. In an example, the 5G Core Network technology is based on a service-based architecture paradigm. Rather than constructing the 5G Core Network as a series of special purpose communication nodes (e.g., an HSS node, an MME node, etc.) running on dedicated server computers, the 5G Core Network is provided as a set of services or network functions. These services or network functions can be executed in a private domain environment which supports dynamic scaling and avoidance of long-term capital expenditures (fees for use may substitute for capital expenditures). In an embodiment, these services or network functions may be executed to connect the UE 552 to the 5G Core Network for receiving voice, data, and messaging services. These network functions can include, for example, a user plane function (UPF) 679, an authentication server function (AUSF) 675, an access and mobility management function (AMF) 676, a session management function (SMF) 677, a network exposure function (NEF) 670, a network repository function (NRF) 671, a policy control function (PCF) 672, a unified data management (UDM) 673, a network slice selection function (NSSF) 674, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G Core Network 558 may be segregated into a user plane 680 and a control plane 682, thereby promoting independent scalability, evolution, and flexible deployment.

The UPF 679 delivers packet processing and links the UE 552, via the access node 554 (in FIG. 5) of a RAN 556, to a data network 690 (e.g., the network 560 illustrated in FIG. 5 or the communication network 118 in FIG. 1). As discussed above, the UE 552 may be the UE 102 that operates with the 5G communication network 118 (FIG. 1). The AMF 676 handles registration and connection management of non-access stratum (NAS) signaling with the UE 552. Said in other words, the AMF 676 manages UE registration and mobility issues. The AMF 676 manages reachability of the UEs 552 as well as various security issues. The SMF 677 handles session management issues. Specifically, the SMF 677 creates, updates, and removes (destroys) protocol data unit (PDU) sessions and manages the session context within the UPF 679. The SMF 677 decouples other control plane functions from user plane functions by performing dynamic host configuration protocol (DHCP) functions and IP address management functions. The AUSF 675 facilitates security processes.

The NEF 670 securely exposes the services and capabilities provided by network functions. The NRF 671 supports service registration by network functions and discovery of network functions by other network functions. The PCF 672 supports policy control decisions and flow-based charging control. The UDM 673 manages network user data and can be paired with a user data repository (UDR) that stores user data such as customer profile information, customer authentication number, and encryption keys for the information. An application function 692, which may be located outside of the Core Network 558, exposes the application layer for interacting with the Core Network 558. In an embodiment, the application function 692 may be execute on an application server 559 located geographically proximate to the UE 552 in an "edge computing" deployment mode. The Core Network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 674 can help the AMF 676 to select the network slice instance (NSI) for use with the UE 552.

In another embodiment, the services or network functions may be executed to connect the UE 552 to the 5G Core Network using non-3GPP access as described in the disclosure. In an example, the UE 552 may register and authenticate with the 5G Core Network 558 using the N3IWF 564 for non-3GPP access. In an example, the N3IWF 564 may be responsible for setting up the IPSec connection to be used by control plane traffic directed to AMF 676/SMF 677, as well as the traffic directed to the UPF 679 for the user plane. In an example, the UE 552 and the N3IWF 564 may establish two IPSec Security Associations (SAs). In an example, the IPsec SAs may be set up between the UE 552 and the N3IWF 564 to establish secure tunnels for communicating Non-Access-Stratum (NAS) signaling messages to the AMF 676 and packets to the data network 690.

Figure 7:
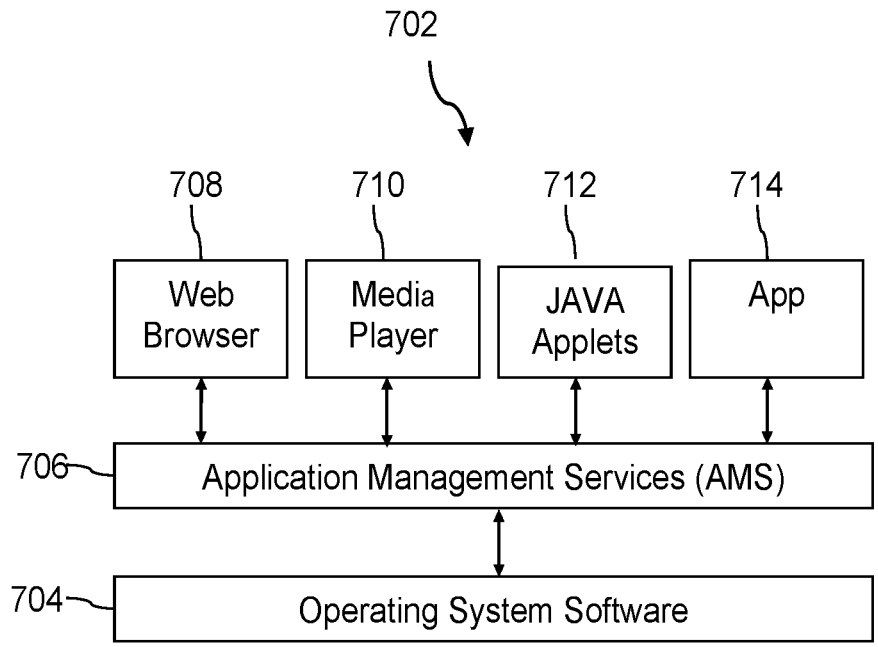
FIG. 7 is a block diagram of software architecture of a communication device according to an embodiment of the disclosure.

FIG. 7 illustrates a software environment 702 that may be implemented by the DSP 402. The DSP 402 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the UE 400. Also shown in FIG. 7 are a web browser application 708, a media player application 710, and JAVA applets 712. The web browser application 708 may be executed by the UE 400 to browse content and/or the Internet, for example when the UE 400 is coupled to a network via a wireless link. The web browser application 708 may permit a user to enter information into forms and select links to retrieve and view web pages. The media player application 710 may be executed by the UE 400 to play audio or audiovisual media. The JAVA applets 712 may be executed by the UE 400 to provide a variety of functionality including games, utilities, and other functionality.

Figure 8:
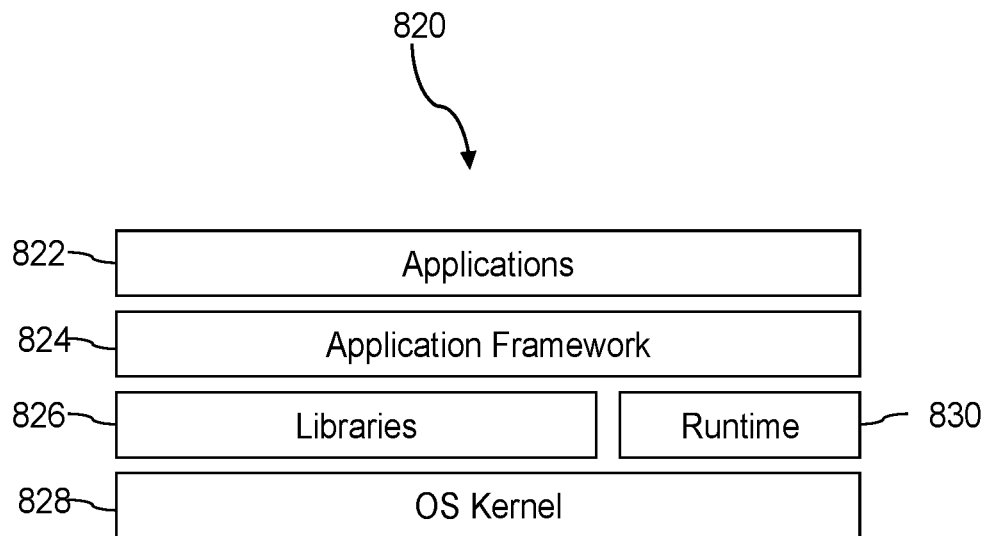
FIG. 8 is a block diagram of another software architecture of a communication device according to an embodiment of the disclosure.

FIG. 8 illustrates an alternative software environment 820 that may be implemented by the DSP 402. The DSP 402 executes operating system kernel (OS kernel) 828 and an execution runtime 830. The DSP 402 executes applications 822 that may execute in the execution runtime 830 and may rely upon services provided by the application framework 824. Applications 822 and the application framework 824 may rely upon functionality provided via the libraries 826.

Figure 9:
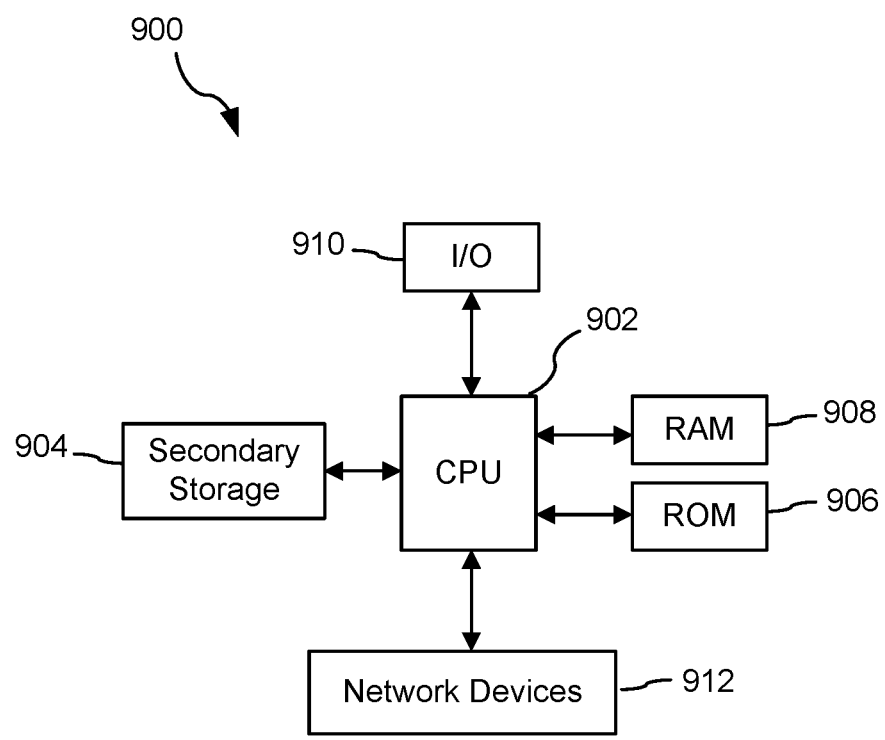
FIG. 9 is a block diagram of a computer system according to an embodiment of the disclosure.

FIG. 9 illustrates a computer system 900 suitable for implementing one or more embodiments disclosed herein. The computer system 900 includes a processor 902 (which may be referred to as a central processor unit (CPU)) that is in communication with memory devices including secondary storage 904, read-only memory (ROM) 906, random-access memory (RAM) 908, input/output (I/O) devices 910, and network connectivity devices 912. The computer system 900 may be UE 102, onboarding server 122, or AAA server 124. The processor 902 may be implemented as one or more CPU chips.

It is understood that by programming and/or loading executable instructions onto the computer system 900, at least one of the CPU 902, the RAM 908, and the ROM 906 are changed, transforming the computer system 900 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application-specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 900 is turned on or booted, the CPU 902 may execute a computer program or application. For example, the CPU 902 may execute software or firmware stored in the ROM 906 or stored in the RAM 908. In some cases, on boot and/or when the application is initiated, the CPU 902 may copy the application or portions of the application from the secondary storage 904 to the RAM 908 or to memory space within the CPU 902 itself, and the CPU 902 may then execute instructions that the application is comprised of. In some cases, the CPU 902 may copy the application or portions of the application from memory accessed via the network connectivity devices 912 or via the I/O devices 910 to the RAM 908 or to memory space within the CPU 902, and the CPU 902 may then execute instructions that the application is comprised of. During execution, an application may load instructions into the CPU 902, for example load some of the instructions of the application into a cache of the CPU 902. In some contexts, an application that is executed may be said to configure the CPU 902 to do something, e.g., to configure the CPU 902 to perform the function or functions promoted by the subject application. When the CPU 902 is configured in this way by the application, the CPU 902 becomes a specific purpose computer or a specific purpose machine.

The secondary storage 904 is typically comprised of one or more disk drives or tape drives and is used for non-volatile storage of data and as an over-flow data storage device if RAM 908 is not large enough to hold all working data. Secondary storage 904 may be used to store programs which are loaded into RAM 908 when such programs are selected for execution. The ROM 906 is used to store instructions and perhaps data which are read during program execution. ROM 906 is a non-volatile memory device which typically has a small memory capacity relative to the larger memory capacity of secondary storage 904. The RAM 908 is used to store volatile data and perhaps to store instructions. Access to both ROM 906 and RAM 908 is typically faster than to secondary storage 904. The secondary storage 904, the RAM 908, and/or the ROM 906 may be referred to in some contexts as computer readable storage media and/or non-transitory computer readable media.

I/O devices 910 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 912 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 912 may provide wired communication links and/or wireless communication links (e.g., a first network connectivity device 912 may provide a wired communication link and a second network connectivity device 912 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, ZIGBEE, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 912 may enable the processor 902 to communicate with the Internet or one or more intranets. With such a network connection, it is contemplated that the processor 902 might receive information from the network, or might output information to the network in the course of performing the above-described method steps. Such information, which is often represented as a sequence of instructions to be executed using processor 902, may be received from and outputted to the network, for example, in the form of a computer data signal embodied in a carrier wave.

Such information, which may include data or instructions to be executed using processor 902 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 902 executes instructions, codes, computer programs, scripts which it accesses from hard disk, floppy disk, optical disk (these various disk based systems may all be considered secondary storage 904), flash drive, ROM 906, RAM 908, or the network connectivity devices 912. While only one processor 902 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 904, for example, hard drives, floppy disks, optical disks, and/or other device, the ROM 906, and/or the RAM 908 may be referred to in some contexts as non-transitory instructions and/or non-transitory information.

In an embodiment, the computer system 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 900 to provide the functionality of a number of servers that is not directly bound to the number of computers in the computer system 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer-usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read-only memory (CD-ROM) disks, floppy disks, jump drives, digital cards, multimedia cards, and others. The computer program product may be suitable for loading, by the computer system 900, at least portions of the contents of the computer program product to the secondary storage 904, to the ROM 906, to the RAM 908, and/or to other non-volatile memory and volatile memory of the computer system 900. The processor 902 may process the executable instructions and/or data structures in part by directly accessing the computer program product, for example by reading from a CD-ROM disk inserted into a disk drive peripheral of the computer system 900. Alternatively, the processor 902 may process the executable instructions and/or data structures by remotely accessing the computer program product, for example by downloading the executable instructions and/or data structures from a remote server through the network connectivity devices 912. The computer program product may comprise instructions that promote the loading and/or copying of data, data structures, files, and/or executable instructions to the secondary storage 904, to the ROM 906, to the RAM 908, and/or to other non-volatile memory and volatile memory of the computer system 900.

In some contexts, the secondary storage 904, the ROM 906, and the RAM 908 may be referred to as a non-transitory computer readable medium or a computer readable storage media. A dynamic RAM embodiment of the RAM 908, likewise, may be referred to as a non-transitory computer readable medium in that while the dynamic RAM receives electrical power and is operated in accordance with its design, for example during a period of time during which the computer system 900 is turned on and operational, the dynamic RAM stores information that is written to it. Similarly, the processor 902 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for defining authentication credentials and authenticating a wireless communication device according to WIFI communication protocols, comprising:
obtaining, at a wireless communication device, a decentralized identity (DID) from one or more of wireless communication-device attributes and user attributes;
sending, by the wireless communication device, the DID to a data registry;
sending, by the wireless communication device, an encrypted authentication request to a core network server, wherein the encrypted authentication request comprises one or more of the DID, a communication device identifier, and the domain name;
receiving, by the data registry, the DID from the wireless communication device;
storing, by the data registry, the DID;
receiving, by the core network server, the encrypted authentication request from the wireless communication device;

sending, by the core network server, the encrypted authentication request to an authentication server based on one or more attributes in the encrypted authentication request;

determining, by the authentication server, a specialized network slice associated with the wireless communication device responsive to receiving the encrypted authentication request;

communicating, by the authentication server, authentication messages to the wireless communication device according to one or more network functions of the specialized network slice; and authenticating, by the authentication server, the wireless communication device according to the specialized network slice responsive to communicating the authentication messages.

2. The method of claim 1, further comprising:

receiving, by the wireless communication device, a software stack from an onboarding server, wherein the software stack comprises one or more software components;

establishing, by the wireless communication device, a secure connection between the wireless communication device and the core network server using one or more elements of the software stack; and sending, by the wireless communication device, the encrypted authentication request using the secure connection.

3. The method of claim 1, further comprising:

obtaining, by the core network server, a domain name from the encrypted authentication request; and sending, by the core network server, the encrypted authentication request to the authentication server of a cellular network operator associated with the core network server when the domain name indicates the wireless communication device is a subscriber to the cellular network operator.

4. The method of claim 1, further comprising:

obtaining, by the core network server, a domain name from the encrypted authentication request; and sending, by the core network server, the encrypted authentication request to the authentication server of an enterprise associated with the wireless communication device when the domain name indicates the wireless communication device is provisioned by the enterprise.

5. The method of claim 2, further comprising sending, by the wireless communication device, the encrypted authentication request over a virtual private network (VPN) connection.

6. The method of claim 2, further comprising:

sending, by the authentication server, a client verification request comprising the DID to the data registry; and receiving, by the authentication server, a client verification response from the data registry responsive to sending the client verification request.

7. The method of claim 6, wherein the client verification response indicates whether the wireless communication device is registered to an enterprise and the specialized network slice assigned to the wireless communication device.

8. A system for defining authentication credentials and authenticating a wireless communication device according to WIFI communication protocols, comprising:

a wireless communication device configured to:

obtain a decentralized identity (DID) from one or more of communication-device attributes and user attributes, send the DID to a data registry, and send an encrypted authentication request to a core network server;

the data registry coupled to the wireless communication device and configured to:

receive the DID from the wireless communication device, and store the DID;

the core network server coupled to the wireless communication device and the data registry and configured to:

receive the encrypted authentication request, and send the encrypted authentication request to an authentication server based on one or more attributes in the encrypted authentication request; and the authentication server coupled to the core network server and to the data registry and configured to:

determine a specialized network slice associated with the wireless communication device based on the encrypted authentication request, communicate authentication messages to the wireless communication device according to one or more network functions of the specialized network slice, and authenticate the wireless communication device according to the specialized network slice responsive to communicating the authentication messages.

9. The system of claim 8, wherein the wireless communication device is further configured to:

receive a software stack from an onboarding server, wherein the software stack comprises one or more software components, establish a secure connection between the wireless communication device and the core network server using one or more elements of the software stack, and send the encrypted authentication request using the secure connection.

10. The system of claim 8, wherein the core network server is configured to:

obtain a domain name from the encrypted authentication request, and send the encrypted authentication request to the authentication server of a cellular network operator associated with the core network server when the domain name indicates the wireless communication device is a subscriber to the cellular network operator.

11. The system of claim 8, wherein the core network server is configured to:

obtain a domain name from the encrypted authentication request, and send the encrypted authentication request to the authentication server of an enterprise associated with the communication device when the domain name indicates the wireless communication device is provisioned by the enterprise.

12. The system of claim 11, wherein the encrypted authentication request comprises one or more of the DID, a communication device identifier, and the domain name.

13. The system of claim 8, wherein the wireless communication device is configured to send the encrypted authentication request over a virtual private network (VPN) connection.

14. The system of claim 8, wherein the authentication server is configured to:

send a client verification request comprising the DID to the data registry, and receive a client verification response from the data registry responsive to sending the client verification request.

15. The system of claim 14, wherein the client verification response indicates whether the wireless communication device is registered to an enterprise and the specialized network slice assigned to the wireless communication device.

16. The system of claim 8, wherein the wireless communication device is without a subscriber identification module (SIM).

17. The system of claim 8, wherein the wireless communication device comprises an Internet of Things (IoT) device.

18. The method of claim 1, further comprising, in response to the authentication, receiving, by the wireless communication device, controlled non-3GPP access to a core network for communicating data between the wireless communication device and the core network as determined by the specialized network slice.

19. The method of claim 1, wherein the wireless communication device is without a subscriber identification module (SIM).

20. The method of claim 1, wherein the wireless communication device comprises an Internet of Things (IoT) device.

* * * * *